United States Patent
Bonzon et al.

(10) Patent No.: US 10,910,749 B2
(45) Date of Patent: Feb. 2, 2021

(54) TIP CONNECTOR FOR FLUIDIC AND ELECTRICAL CONNECTION

(71) Applicant: ECOLE POLYTECHNIQUE FEDERALE DE LAUSANNE (EPFL), Lausanne (CH)

(72) Inventors: David Vincent Bonzon, Le Mont-Pelerin (CH); Jean-Pierre Bonzon, Le Mont-Pelerin (CH); Georges Henri Muller, Lausanne (CH); Jean-Baptiste Bureau, Ecublens (CH); Yann Barrandon, Echandens-Denges (CH); Philippe Renaud, Preverenges (CH); David Forchelet, Coffrane (CH); Nicolas Uffer, Riex (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/604,778

(22) PCT Filed: Apr. 5, 2018

(86) PCT No.: PCT/IB2018/052363
§ 371 (c)(1),
(2) Date: Oct. 11, 2019

(87) PCT Pub. No.: WO2018/189628
PCT Pub. Date: Oct. 18, 2018

(65) Prior Publication Data
US 2020/0381853 A1 Dec. 3, 2020

(30) Foreign Application Priority Data
Apr. 11, 2017 (WO) .................. PCT/IB2017/052088

(51) Int. Cl.
*H01R 13/00* (2006.01)
*G01N 15/12* (2006.01)
(Continued)

(52) U.S. Cl.
CPC .......... *H01R 13/005* (2013.01); *B01L 3/0275* (2013.01); *B01L 3/563* (2013.01);
(Continued)

(58) Field of Classification Search
CPC ....... H01R 13/005; G01N 15/12; B01L 3/563; B01L 3/0275; B01L 2300/0645;
(Continued)

(56) References Cited

U.S. PATENT DOCUMENTS

| 3,714,565 A | 1/1973 | Coulter et al. |
| 2010/0199788 A1 | 8/2010 | Ayliffe et al. |

(Continued)

FOREIGN PATENT DOCUMENTS

| GB | 2519957 A | 5/2015 |
| WO | 2015/056176 A1 | 4/2015 |

(Continued)

OTHER PUBLICATIONS

International Search Report for PCT/IB2018/052363, dated Jul. 31, 2018, 5 pages.

*Primary Examiner* — Sherman Ng
(74) *Attorney, Agent, or Firm* — Nixon & Vanderhye P.C.

(57) ABSTRACT

A connector for providing both a fluidic and electrical connection is disclosed, said connector having a proximal end, a distal end and an elongated body in between, characterized in that the elongated body has an inner cavity spanning throughout its length, and the distal end comprises: a) an inner body portion comprising a first inner electrical contact and b) an outer body portion comprising a second outer electrical contact having a spring element. The con- (Continued)

nector is easily adaptable to many kind of fluidic actuators and particularly to pipette instruments usually found in laboratory practice and developed to adapt fluidic actuators and pipette instalments to work according to the Coulter principle in every working condition, in particular to adapt the electrical and fluidic connection between a sensing tip and an instrumented pipette.

8 Claims, 7 Drawing Sheets

(51) Int. Cl.
    *G01N 35/10*     (2006.01)
    *B01L 3/02*     (2006.01)
    *B01L 3/00*     (2006.01)

(52) U.S. Cl.
    CPC ............ *G01N 15/12* (2013.01); *G01N 35/10* (2013.01); *B01L 2200/026* (2013.01); *B01L 2200/0689* (2013.01); *B01L 2300/0645* (2013.01); *B01L 2300/0832* (2013.01); *G01N 2035/103* (2013.01); *G01N 2035/1062* (2013.01)

(58) Field of Classification Search
    CPC ....... B01L 2300/0832; B01L 2200/026; B01L 2200/0689
    USPC ...................................................... 174/70 R
    See application file for complete search history.

(56) References Cited

U.S. PATENT DOCUMENTS

| | | | |
|---|---|---|---|
| 2011/0303593 A1* | 12/2011 | Reinhardt | F16L 19/061 |
| | | | 210/143 |
| 2012/0016292 A1 | 1/2012 | Goldberg et al. | |
| 2012/0091008 A1 | 4/2012 | Muir et al. | |
| 2012/0161434 A1* | 6/2012 | Wells | F16L 33/01 |
| | | | 285/222.3 |
| 2013/0095508 A1 | 4/2013 | Campitelli et al. | |
| 2013/0252461 A1* | 9/2013 | Gross | H01R 13/5227 |
| | | | 439/577 |
| 2015/0123809 A1 | 5/2015 | Burkart et al. | |

FOREIGN PATENT DOCUMENTS

| | | |
|---|---|---|
| WO | 2016/113984 | 7/2016 |
| WO | 2016/166729 A1 | 10/2016 |

* cited by examiner

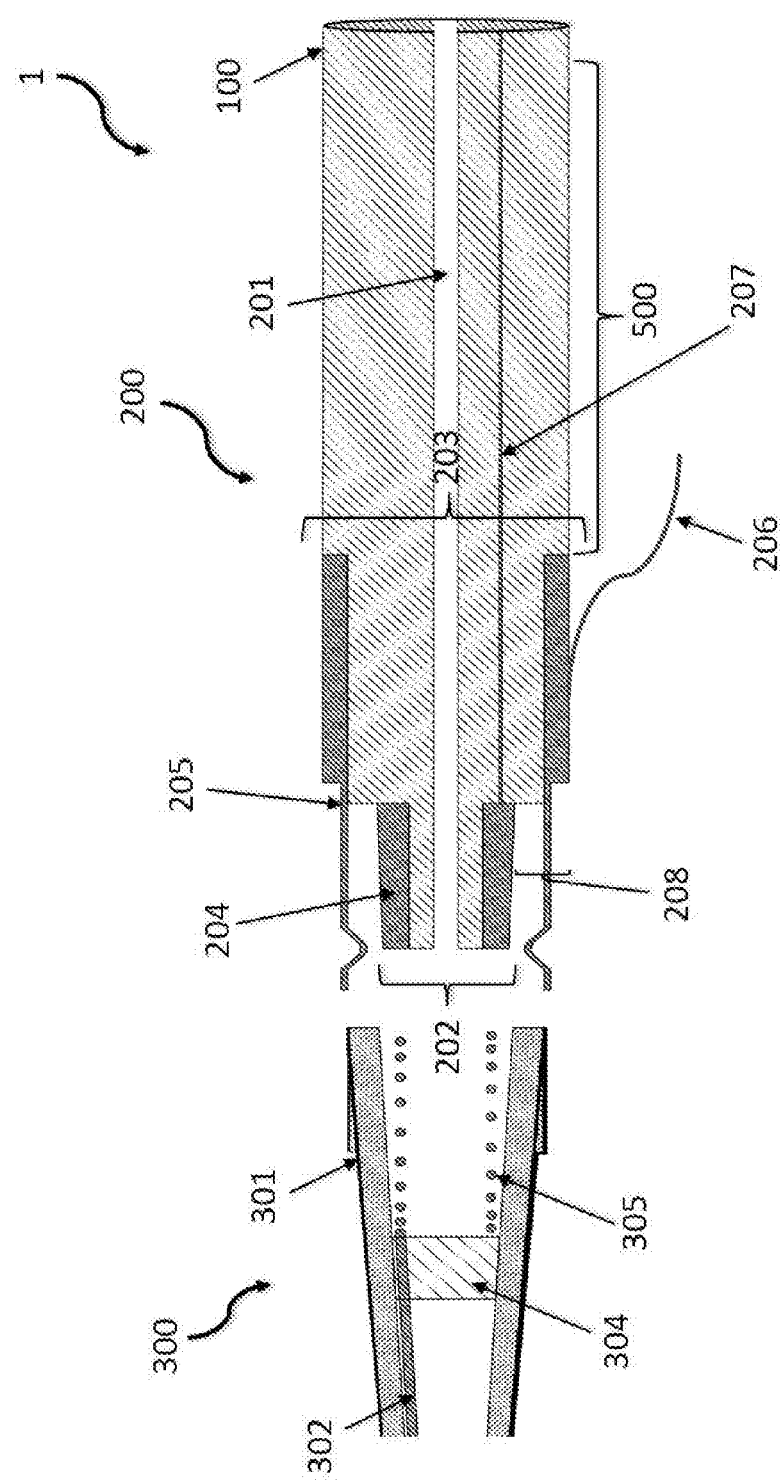

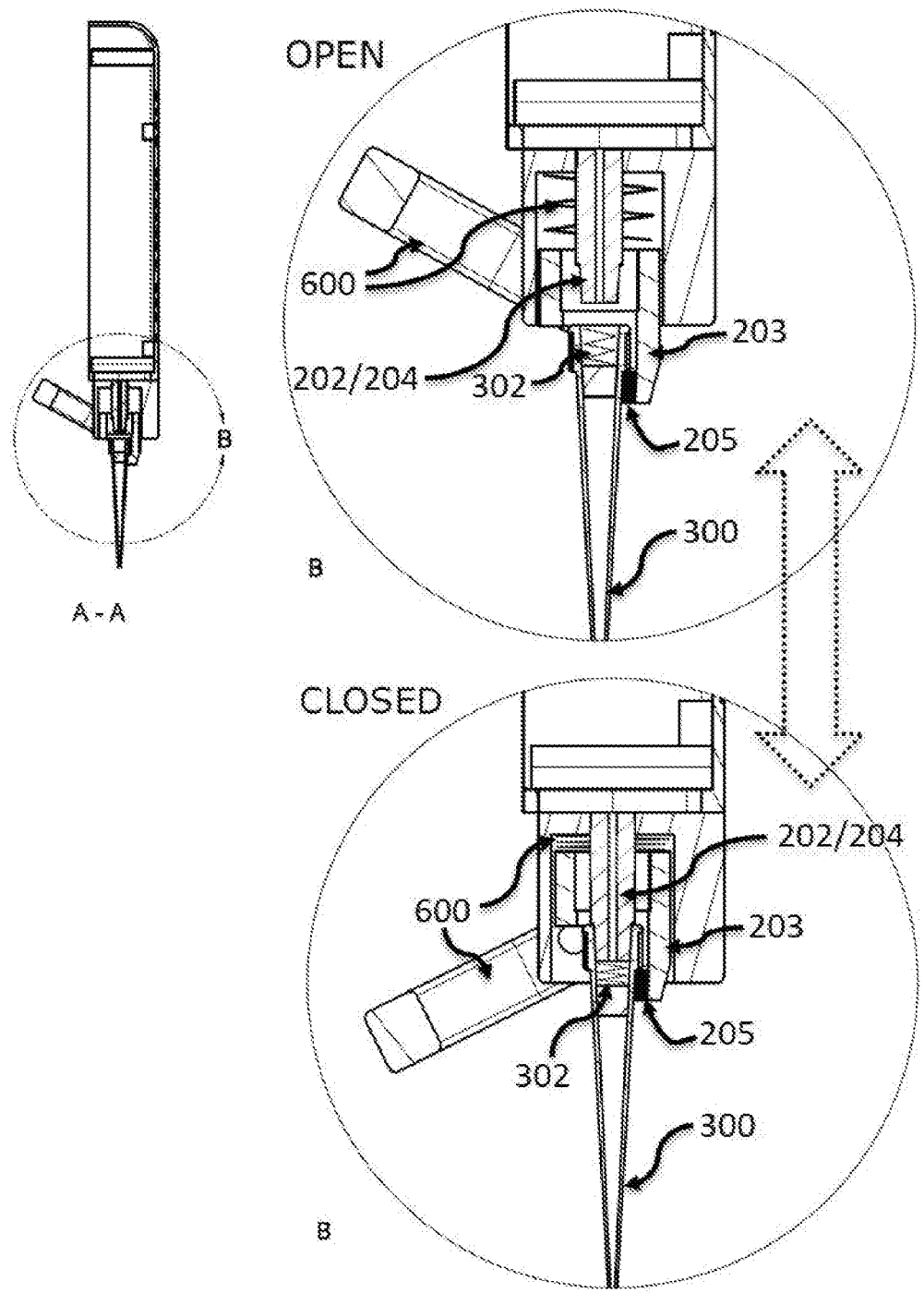

TIP CONNECTOR FOR FLUIDIC AND ELECTRICAL CONNECTION

This application is the U.S. national phase of International Application No. PCT/IB2018/052363 filed 5 Apr. 2018, which designated the U.S. and claims priority to International Application No. PCT/IB2017/052088 filed 11 Apr. 2017, the entire contents of each of which are hereby incorporated by reference.

TECHNICAL FIELD

The invention relates to a connector for use as a hybrid means for establishing fluidic and electrical connections at the same time.

Background Art

Sensing or measuring a property of a liquid, e.g. the measurement of a concentration of an electrolyte or particles dispersed therein, is an exercise widespread in laboratories, clinics, or biotech industry. For example, clinical diagnostic devices often handle liquids, in which case means for the measuring the property thereof are needed. Such measurements can be sensed for example by monitoring a signal through a sensor. The signal from the sensor may change according to e.g. whether the sensor is in contact with a liquid or not, or to the passage of sample particles through a sensing area arranged closed to said sensor.

Sensing a property of a liquid requires the sensing element of the sensor, e.g. one or more electrodes, to come into contact with the liquid. The contact of the sensing element with the liquid generates an electrical signal encoding a sensing value. Evaluation means receive and process the electrical signal and output an outcome of the sensing, e.g. a measurement value.

Sensors sensing a property of a liquid need to combine in a single device fluidic paths for contacting the liquid and an electrical connection portion for supplying electrical power from a source of electrical power to the sensor. Furthermore, the liquid contacts need to be operatively, e.g. electrically, connected to an electrical sensing circuit for transmission of the sensing value to the evaluation means.

Conventional impedance-based sensing of particles, such as impedance-based flow cytometry, is a well-accepted method for the counting, sizing and sorting of particles and cells and finds wide application in clinical and veterinary laboratories for the analysis of blood, cell suspensions, and other samples, and allows simultaneous multiparametric analysis of the physical and chemical characteristics of up to thousands of particles per second.

Impedance-based single cell analysis systems are commonly known as Coulter counters. They represent a well-established method for counting and sizing virtually any kind of cells and particles. A typical Coulter counter has one or more (micro)channels that separate two chambers containing electrolyte solutions. The Coulter principle states that particles pulled through an orifice, concurrent with an electric current, produce a change in impedance that is proportional to the volume of the particle traversing the orifice. This pulse in impedance originates from the displacement of electrolyte caused by the particle. As fluid containing particles or cells is drawn through each microchannel, each particle causes a brief change to the electrical resistance of the liquid. The counter detects these changes in electrical resistance. Counting the electrical events that occur when a metered volume of suspending medium is drawn through the channel, and then dividing the count by the volume is done to determine the concentration of particles in a sample.

Cells, being poorly conductive particles at low frequencies, alter the effective cross-section of the conductive microchannel. If these particles are less conductive than the surrounding liquid medium, the electrical resistance across the channel increases, causing the electric current passing across the channel to briefly decrease. By monitoring such pulses in electric current, the number of particles for a given volume of fluid can be counted. The size of the electric current change is related to the size of the particle, enabling a particle size distribution to be measured, which can be correlated to mobility, surface charge, and concentration of the particles.

Many investigators have designed a variety of devices based on the Coulter principle. In particular, the present inventors previously developed a novel concept design for a Coulter principle-based sensor integrated into a pipette tip usually used in laboratory practice, such as commercially available plastic pipette tips, to be used in combination with an instrumented pipette or a robotic system adapted to finely regulate the pressure within the tip and to retrieve an impedance signal via a time-resolved impedance analyser once a particle traverse a sensing area present on the tip's distal end (WO/2015056176 and WO/2016166729, incorporated herein in their entirety by reference).

However, to operate such a sensing tip, an electrical signal needs to transit from the tip sensor to the pipette and the pressure in the tip needs to be applied from the pipette. For this purpose, a specific pipette connector is needed. This connector has to simultaneously allow the electrical signal and pneumatic or fluidic actuation between a tip and a pipette.

Some "hybrid" connectors has been described in the past. For instance, UK Patent Application GB2519957 discloses a connection device for providing both a connection for liquid transport and a connection for the transport of electrical energy, the connection device comprising a first part and a second part detachably connectable to one another, each part comprising a liquid conduit connectable to the liquid conduit of the other part, and a coil inductively coupleable to the coil of the other part.

US 2013/0252461 describes a plug and socket connector system for use, in particular, in medical technology comprising a plug and a socket, wherein each of the two comprises at least one fluid connector clement. The fluid connector elements are provided with electrical contact arrangements thus providing a space-saving, robust and safe system.

US 2010/0199788 describes and instrumented pipette tip and an apparatus comprising a specific electrical connector. This prior art device is adapted to work in combination with a specific flat pipette tip made of a plurality of microfluidic and electronic layers.

Despite the amount of work done in the field, none of the prior art disclosures describe a connector adapted to be universally coupled with fluidic actuators such as pipette instruments usually found in laboratory practice, and that is enough robust, easy to manipulate and tolerant to vibrating environment for being used in e.g. particles' analysis according to the Counter principle.

SUMMARY OF INVENTION

The present invention relates to a connection device for connecting both and simultaneously a fluid path and an electrical circuit, which is adapted to work with most fluidic actuators and which is particularly intended for implementation into a pipette instrument. In particular, the connector according to the invention can be an integral portion of a pipette or pipette-like instrument or can be used as an easily connectable and releasable add-on to render a fluidic actuator, such as a conventional pipette used in laboratory practice, an instrumented one.

One aim of the invention was to provide a connector which was easily adaptable to many kind of fluidic actuators and particularly to pipette instruments usually used in laboratory practice.

Another aim of the invention was to provide a connector able to function as a fastening means for pipette tips and allowing at the same time, if needed, an electrical contact between said tips and electrical systems, independently of the relative positioning of the tips compared to the fluidic actuator (e.g. a pipette instrument).

Still a further aim of the invention was to develop a connector to adapt fluidic actuators and pipette instruments to work according to the Coulter principle in every working condition, in particular to adapt the electrical and fluidic connection between a sensing tip and an instrumented pipette. All these aims have been accomplished through the present invention, as disclosed in the following description and in the appended claims.

The connector of the invention has been studied and conceived to allow a fluid and an electrical connection in every working condition, to permit a reliable and strong physical connection of the electrical path to a pipette tip while at same time guaranteeing a fluidic connection between a fluidic actuator, such as a pipette instrument, and a pipette tip.

The connector comprises an elongated body having a proximal end adapted, if needed, to be releasably attached to the distal end of a fluidic actuator. The elongated body has an inner cavity which is designed to be in fluidic connection with the fluidic path of the fluidic actuator.

The distal end of said connector comprises an inner body portion adapted to inwardly and radially engage the inner body wall of a pipette tip and comprising a first inner electrical contact and a second, external electrical contact in the form of a spring element placed on the outer body portion of the connector. Said outer body portion has a cross-section bigger than the cross-section of the inner body portion. Both the inner and the external electrical contact are adapted to be operably connected with external electrical devices or systems such as for instance an impedance analyser, through e.g. wiring.

Accordingly, it is an object of the present invention to provide a connector for providing both a fluidic and electrical connection, said connector having a proximal end, a distal end and an elongated body in between, characterized in that:
  the elongated body has an inner cavity spanning throughout its length and
  the distal end comprises:
    a. an inner body portion comprising a first inner electrical contact and
    b. an outer body portion comprising a second outer electrical contact having a spring element.

In preferred embodiments, the inner body portion is adapted to releasably engage the inner body wall of a pipette tip.

In one embodiment, the inner body portion consist of a conductive material usable as first inner electrical contact.

In one embodiment, the first inner electrical contact comprises or consists of a spring element, such as a coil spring or a spring tab.

In one embodiment, the second outer electrical contact comprises a spring tab, a spring latch, a spring clip or a tension spring.

In preferred embodiments, the first inner electrical contact and/or the second outer electrical contact are circumferentially disposed around the inner body portion and the outer body portion of the connectors' distal end, respectively.

In preferred embodiments, the inner cavity coaxially traverses the inner body portion.

Another object of the present invention relates to an assembly comprising a fluidic actuator and the connector of the invention.

BRIEF DESCRIPTION OF DRAWINGS

In the Figures:
FIG. 1*a* shows a cross-view of one embodiment of the connector according to the present invention;
FIGS. 1*c*-1*h* show different embodiments of the connector according to the present invention.

DESCRIPTION OF EMBODIMENTS

The present disclosure may be more readily understood by reference to the following detailed description presented in connection with the accompanying drawing figures, which form a part of this disclosure. It is to be understood that this disclosure is not limited to the specific conditions or parameters described and/or shown herein, and that the terminology used herein is for the purpose of describing particular embodiments by way of example only and is not intended to be limiting of the claimed disclosure.

As used herein and in the appended claims, the singular forms "a", "an" and "the" include plural referents unless the context clearly dictates otherwise. Thus, for example, reference to "an electrode" includes a plurality of such electrodes Also, the use of "or" means "and/or" unless stated otherwise. Similarly, "comprise", "comprises", "comprising", "include", "includes" and "including" are interchangeable and not intended to be limiting. It is to be further understood that where descriptions of various embodiments use the term "comprising", those skilled in the art would understand that in some specific instances, an embodiment can be alternatively described using language "consisting essentially of" or "consisting of."

Figure 1B:
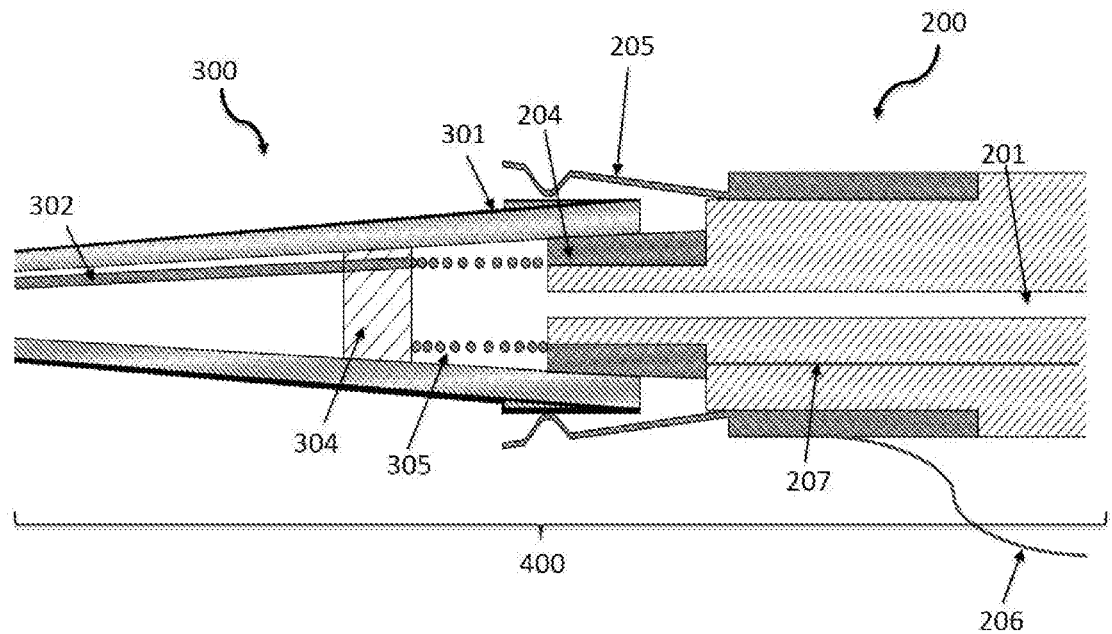
FIG. 1*b* shows a cross-view of a connector/pipette tip assembly.
Figure 1C:
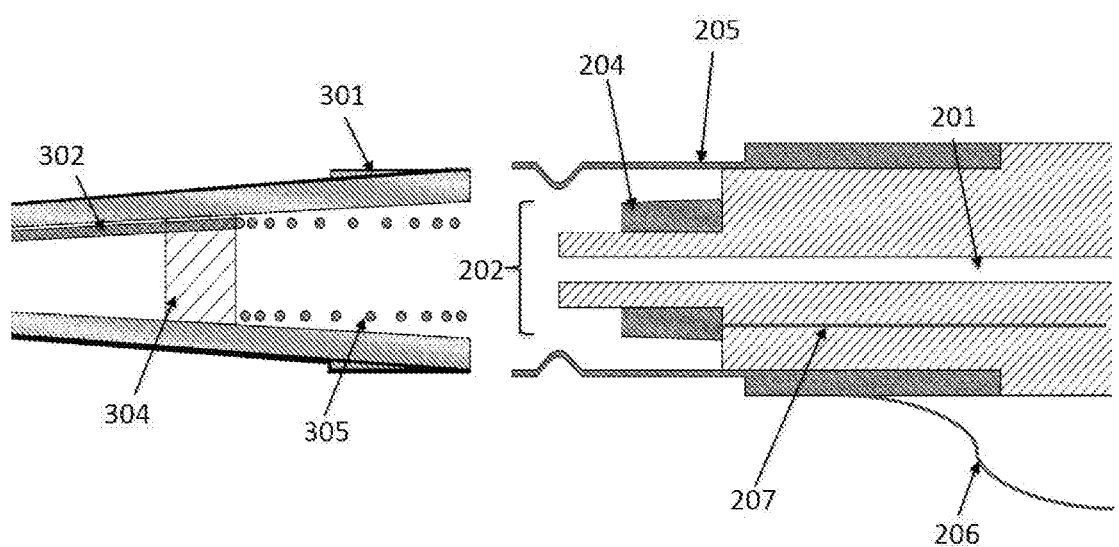
Figure 1D:
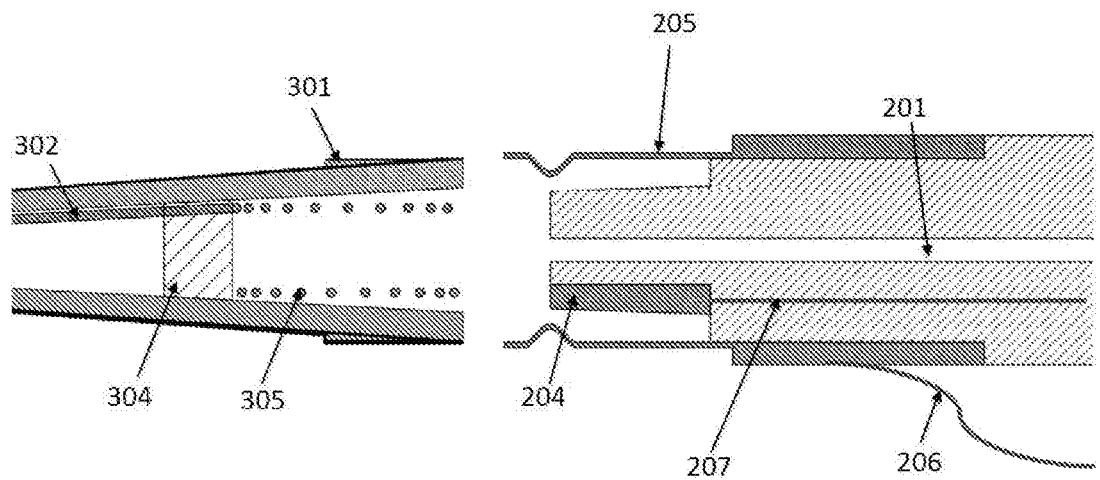
Figure 1E:
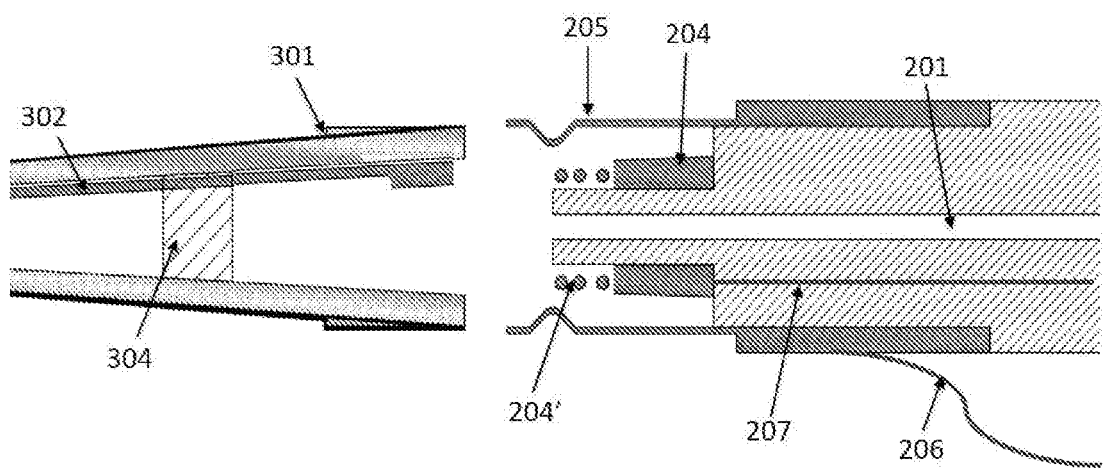

With reference to FIG. 1*a*, a schematic cross-section illustration of a connector 1 according to one embodiment of the invention is shown, as well as a "sensing tip" 300 composed of a replaceable pipette tip having two electrodes placed on the internal cavity and on the external wall portion thereof. An assembly 400 comprising a connector 1 and replaceable pipette tip 300 is shown in FIG. 1*b*.

Connector 1 comprises a proximal end 100 that, in use, fits with the distal portion of a fluidic actuator (not show). As it will be apparent to a person skilled in the art, a suitable seal must be formed between the proximal end 100 and the fluidic actuator in order for a connector-pipette tip assembly 400 to successfully aspirate/dispense a liquid sample. The proximal end 100 is designed to be fixedly implemented in a fluidic actuator's distal end, in order to have a built-in connector/actuator assembly, or it can even be releasably attached to the distal end of a fluidic actuator. This latter aspect advantageously allows to use and adapt the connector 1 with different kind of fluidic actuators depending on the needs, so to provide a concomitant fluidic and electrical connection to different instruments.

Connector 1 further comprises an elongated body 500 having an inner cavity 201 which is designed to be in fluidic connection with the fluidic path of the fluidic actuator. Inner cavity 201 spans throughout the entire length of the connector 1 in order to fluidically couple a fluidic actuator with a pipette tip (300 in FIG. 1b).

Figure 2:
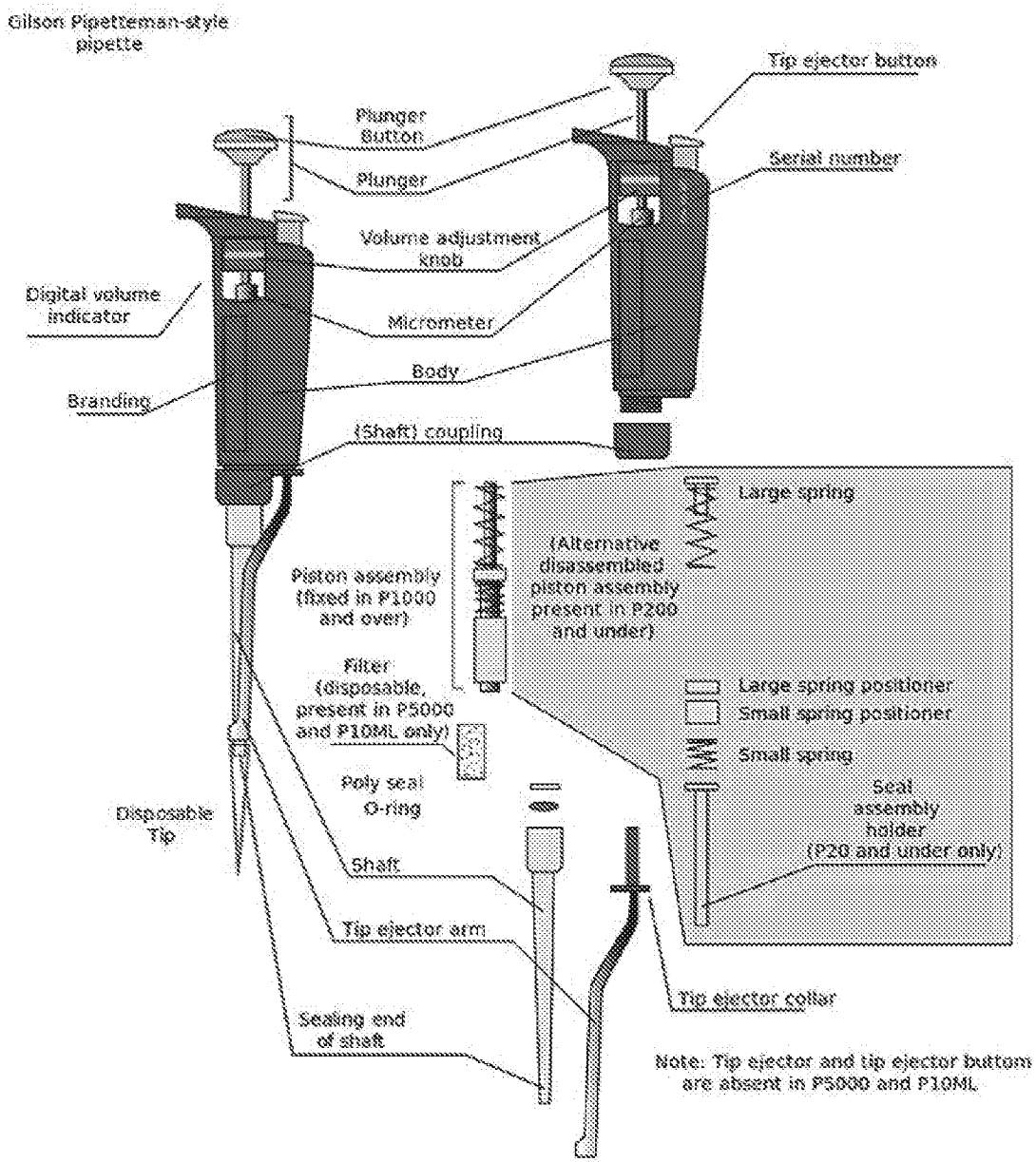
FIG. 2 shows a prior art pipette instrument conventionally used in laboratory practice.

A typical fluidic actuator is adapted to control the aspiration, retention and dispense of a fluid medium, typically a liquid medium. In its simplest embodiment, a fluidic actuator is any kind of device able to apply a pressure on a pipette tip operably connected thereto. In this embodiment, the fluidic actuator commonly works by exerting, upon activation, a negative pressure change inside a tip connected thereto to aspire a fluid, and selectively releasing said fluid to draw up and dispense it according to a preferred volume by applying a positive pressure change. A syringe or syringe-like device could be suitable for this purpose. In a preferred, alternative embodiment, devices such as a manual or electronic pipette instruments, as commercially available ones, could be used. A prior art example of such a pipette instrument is shown in FIG. 2. Robotic configurations of the same are also envisageable.

The distal end 200 of the connector comprises the electrical elements for establishing the electrical connection between a pipette tip and external devices such as an impedance analyser. In this context, it should be highlighted that the inventive concept and design behind the connector 1 of the invention directly stems from the specific design of a so-called "sensing tip" as described in WO/2015056176 and WO/2016166729, owned by the present Applicant. Said pipette tip, herein schematically depicted in FIG. 1 with the label 300, has been specifically conceived in order to work with a conductive medium comprising particles to be analysed according to the Counter principle. However, this does not form part of the present disclosure, and it is herein described for clarity purposes only. Moreover, different kind of sensing tips having different designs, such as the one described in U.S. Pat. No. 3,714,565, would be theoretically suitable for working in combination of the connector disclosed herein.

The sensing tip 300 shown in e.g. FIG. 1a includes an elongated, substantially tubular body, typically having a frusto-conical shape, that has a bottom opening (hereinafter, "distal end") at the bottom end for the flow passage of a liquid, a top opening (hereinafter, "proximal end") at the top end for the passage of air, and a passageway (hereinafter, "elongated body") between the bottom opening and top opening for the retention of a liquid inside the tip defined by at least one delimiting wall. An outer electrode 301 is placed on outer wall of the tip's body and an inner electrode 302 is located within the inner body portion of the same tip. In the embodiment depicted in FIG. 1a, electrode 302 comprises a conductive wire-like element "floating" within the inner cavity of the tip and a final coil-like structure 305. In at least some embodiments, a sterility filter 304 helps in keeping electrode 302 in place within the tip cavity. As it is, a sensing tip 300 could be directly connected to a fluidic actuator such as a pipette and at the same time with external device(s) providing electrical power supply and/or sensing operation.

When in function, the pipette tip 300 is loaded with a conductive medium, comprising particles (e.g. cells) to be analysed, in which one of the electrodes is at least partially immersed. The electrodes 301 and 302 are used to establish a determined electric field so that a current can flows between the inner and the outer electrodes. Once the loaded pipette tip is immersed in a reservoir which comprises a conductive medium and the second electrode at least partially immersed therein, both current and particles are forced to flow through the exit orifice, thus flowing from the inside of the pipette tip into the reservoir. The sensing area of the pipette tip is precisely located within the tip thereof, at the frontier with the external conductive medium. Knowing the electrical field and measuring the current, each single particle flowing outside (or inside) of the tube's sensing area can be detected and analysed via e.g. impedance spectroscopy or Coulter counting. For this purpose, a particle detector, such as a time-resolved impedance analyser, is used.

Figure 3:
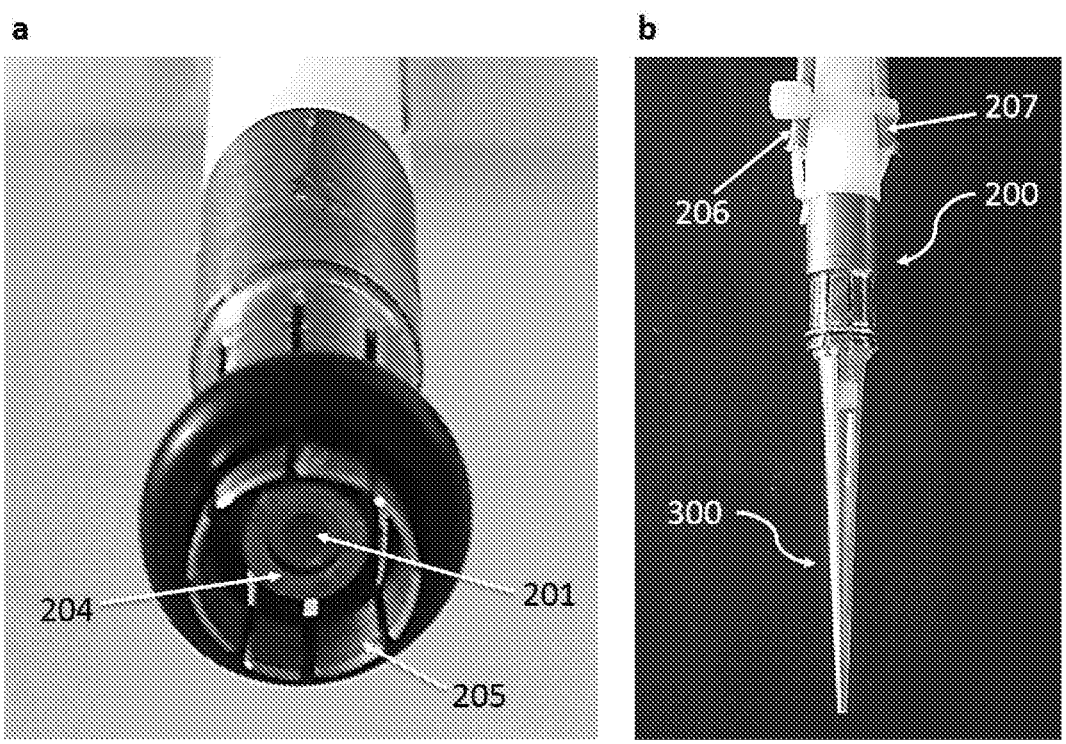
FIG. 3*a* shows a photography of a working prototype of the connector of the invention.
FIG. 3*b* shows a photography of a connector/sensing tip assembly.

Some typical problems encountered during operation of the sensing tip/fluidic actuator assembly herein described relate to the vibrating environment in which the operations are performed, the need to guarantee suitable electrical contacts together with a suitable seal and fluidic connection, and the ease of adapting several components such as impedance analysers and fluidic actuators with pipette tips without excessively drift from the standard laboratory practice. Accordingly, the connector 1 foresees a distal portion 200 expressly designed to address the aforementioned issues. Said distal end 200 comprises an inner body portion 202 comprising a first inner electrical contact 204 and an outer body portion 203 comprising a second outer electrical contact 205 in the form of a spring element. Particularly, electrical contact 205 can be a spring tab, a spring latch, a spring clip or a tension spring; in an implemented embodiment of the invention, electrical contact 205 is a spring tab "crown" circumferentially disposed around the outer body portion 203 of the connectors' distal end 200 (FIGS. 3a and 3b). This arrangement assures a noise-free electrical contact with the outer electrode 301 of a sensing tip 300 in vibrating environments while avoiding, at the same time, any need to precisely couple the pipette tip 300 relative to the connector 1. Electrical contacts 204 and 205 comprise or consist of a conductive metallic material such as Au, Pt, Cu, Ag, stainless steel and the like.

Figure 1F:
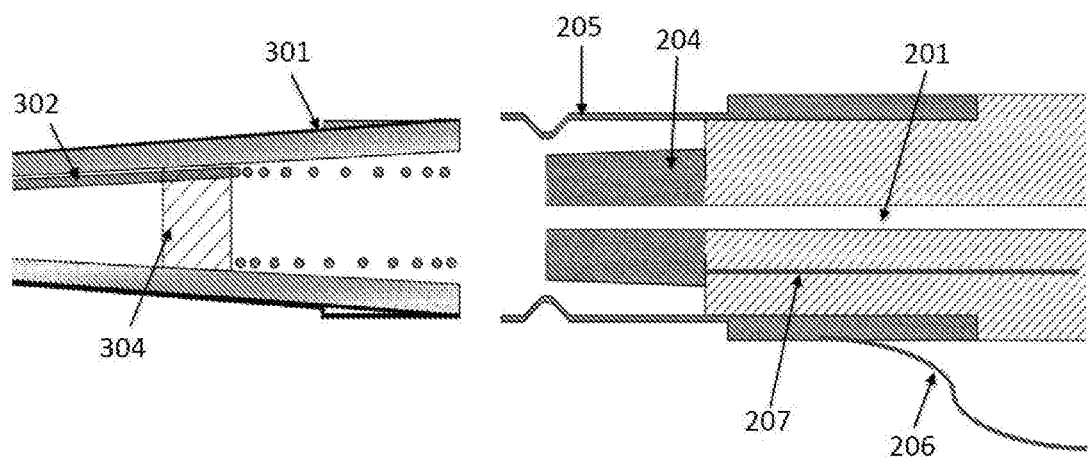

The inner body portion 202 has a cross-section smaller than the cross-section of the outer body portion 203, and is adapted to releasably engage the inner body wall of a pipette tip's 300 proximal end. In doing so, a pipette tip/connector assembly is allowed to operate properly, thanks firstly to a suitable seal formed between these two assembly components. Advantageously, the cavity 201 coaxially traverses the inner body portion 202, so to fluidically couple a fluidic actuator with a tip 300. At the same time, a proper electrical contact is established between the first inner electrical contact 204 of the connector 1 and the internal electrode 302 of the tip. In one embodiment, the inner body portion 202 consists of a conductive material, thus working per se as first inner electrical contact 204 (FIG. 1f). A flange 208 can be present between the inner body portion 202 and the outer body portion 203.

Figure 1G:
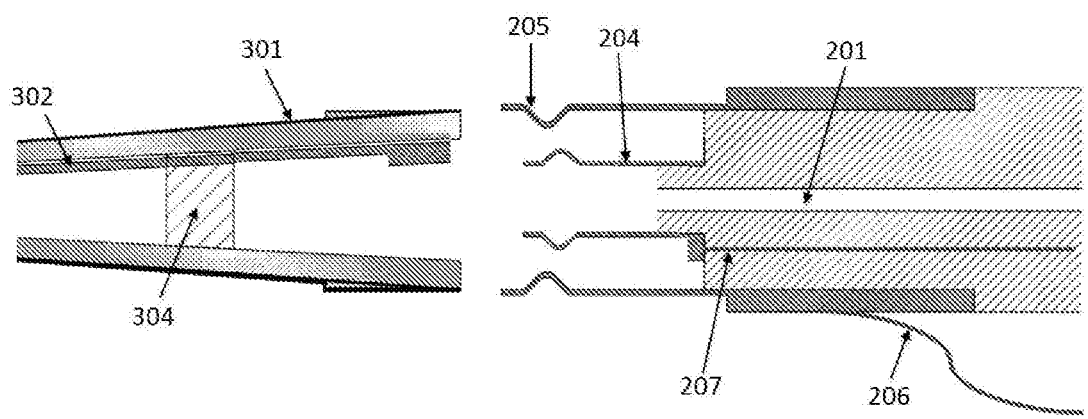

Alternatively, the first inner electrical contact 204 comprises or consists of a spring element, such as a coil spring (FIG. 1e) or a spring tab (FIG. 1g). This embodiment is particularly advantageous to assure, also for the internal electrical contacts, a noise-free, vibration-tolerant behaviour. As it will be apparent, in this embodiment the first inner electrical contact 204 is circumferentially disposed around the inner body portion 202. However, in certain embodiments the inner electrical contact 204 can be present only on a segment of the inner body portion 202 (FIGS. 1c and 1d), or can even be circumferentially disposed around the inner body portion 202 in a solid, non-coiled fashion. This embodiment is particularly advantageous in terms of manufacturing when the connector 1 is intended to be used in combination with a pipette tip having a coil-ended (305) inner electrode 302, as shown in e.g. FIG. 1f. Both the inner and the outer electrical contacts 204 and 205 can be operably connected with external devices such as preferably impedance analysers through e.g. cable connections or wirings 206 and 207.

In still another embodiment, as depicted in FIG. 1h, the outer body portion 203 is designed to be slid along its longitudinal axis (i.e. coaxially with respect to the main longitudinal axis of the connector) from a first position to a second position. In this configuration, the second outer electrical contact 205 is implemented as a conductive element having a spring behaviour such as a spring tab located along the inner side (i.e., towards the inner cavity 201 of the connector) of the outer body portion 203. In the depicted embodiment, the inner electrical contact 204 is implemented as an electrically-conductive body comprising an inner cavity 201 in contact with a spring inner electrode 302 of a sensing tip 300. In one aspect, the distal end of the outer body portion 203 can comprise a slot designed to accommodate or at least lodge a pipette tip 300. In this configuration, the spring electrical contact 205 is fabricated and/or placed along the inner side of the outer body portion 203 so to load a sensing tip and block the connector-tip assembly upon slide of the outer body portion 203 from a first (non-active, distal) position to a second (active, proximal) position, resulting in a final locking of the internal electrical connection together with the fluidic connection.

Alternatively, a pipette tip 300, such as a sensing tip, can be fixed directly to the inner body portion 202, in contact with the first inner electrical contact 302, and the outer body portion 203 can be brought into contact with a sensing pipette tip upon need. This configuration is particularly suitable and advantageous in those situations in which the connector is to be used in turn as a classical fluidic connector or as a hybrid fluidic/electrical connector: the electrical connection is established only on demand, by sliding the outer body portion 203 from the inactive, distal position to the active one.

To do so, an associated mechanical switch 600 is operatively coupled with the outer body portion 203, for instance with a meta-stable knob or lever possibly connected with a spring mechanism, adapted to slide the outer body portion 203 in such a way that the spring electrical contact 205 is brought into contact with an outer electrode 301 of a sensing tip 300. Possibly, the inner side of the outer body portion 203 of the connector is tapered so to facilitate the establishment of a solid and reliable electrical contact.

It is understood that the dimensions of the inner body portion 202 are driven by those of pipette tip 300 and therefore can be varied for different sizes of pipette tips without departing from the invention. In a preferred embodiment of the invention, the diameter of the inner body portion 202 is approximately between 85 and 95% of the inner diameter of the entrance aperture (proximal end) of tip 300. As it will be apparent to a person skilled in the art, this can change depending on the used tip 300, which can vary according to the driving needs; commercially available pipette tips can handle usually between 2 μl and 1 ml of a liquid, and their dimensions change correspondingly. The inner diameter of the proximal end of a pipette tip 300 can span between 1 to 10 mm. In an implemented embodiment according to the invention, the diameter of the inner body portion 202 is 4.7 mm, which corresponds to about 94% of the inner diameter of the proximal end of a 200 μl pipette tip 300.

The invention claimed is:

1. A connector for providing both a fluidic and electrical connection, said connector having a proximal end, a distal end and an elongated body in between, wherein:
   the elongated body has an inner cavity spanning throughout its length and
   the distal end comprises:
   an inner body portion comprising a first inner electrical contact and
   an outer body portion comprising a second outer electrical contact having a spring element, and
   wherein the inner body portion is adapted to releasably engage the inner body wall of a pipette tip.

2. The connector of claim 1, wherein the second outer electrical contact is circumferentially disposed around the outer body portion of the connectors' distal end.

3. The connector of claim 1, wherein the first inner electrical contact is circumferentially disposed around the inner body portion of the connectors' distal end.

4. The connector of claim 1, wherein the inner body portion consists of a conductive material usable as first inner electrical contact.

5. The connector of claim 1, wherein the first inner electrical contact comprises or consists of a spring element, such as a coil spring or a spring tab.

6. The connector of claim 1, wherein the second outer electrical contact 205 comprises a spring tab, a spring latch, a spring clip or a tension spring.

7. The connector of claim 1, wherein the inner cavity coaxially traverses the inner body portion.

8. An assembly comprising a fluidic actuator and the connector of claim 1.

* * * * *